United States Patent
Lv

(10) Patent No.: US 8,416,787 B2
(45) Date of Patent: Apr. 9, 2013

(54) METHOD, SYSTEM AND APPARATUS FOR IMPLEMENTING L2VPN BETWEEN AUTONOMOUS SYSTEMS

(75) Inventor: Hong Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 12/842,032

(22) Filed: Jul. 23, 2010

(65) Prior Publication Data

US 2010/0284308 A1 Nov. 11, 2010

Related U.S. Application Data

(63) Continuation of application No. PCT/CN2009/071284, filed on Apr. 15, 2009.

(30) Foreign Application Priority Data

May 6, 2008 (CN) .......................... 2008 1 0097220

(51) Int. Cl.
*H04L 12/28* (2006.01)
(52) U.S. Cl. .................... 370/395.53; 370/401; 370/352; 370/392
(58) Field of Classification Search .......... 370/351–429; 709/221

See application file for complete search history.

(56) References Cited

U.S. PATENT DOCUMENTS

| 7,136,374 | B1 | 11/2006 | Kompella |
| 2004/0037296 | A1 | 2/2004 | Kim et al. |
| 2005/0265329 | A1* | 12/2005 | Havala et al. ................. 370/389 |
| 2006/0182122 | A1* | 8/2006 | Davie et al. .............. 370/395.53 |
| 2006/0262735 | A1* | 11/2006 | Guichard et al. ............. 370/254 |
| 2010/0061379 | A1* | 3/2010 | Parandekar et al. ..... 370/395.53 |

FOREIGN PATENT DOCUMENTS

| CN | 1722726 A | 1/2006 |
| CN | 1809070 A | 7/2006 |
| CN | 1832443 A | 9/2006 |
| CN | 101277245 A | 10/2008 |
| EP | 1770902 A1 | 4/2007 |
| EP | 2230800 A1 | 9/2010 |
| WO | 2006084956 A1 | 8/2006 |

OTHER PUBLICATIONS

Written opinion issued in corresponding PCT application No. PCT/CN2009/071284, dated Jul. 23, 2009; total 5 pages.

(Continued)

*Primary Examiner* — Kibrom T Hailu
*Assistant Examiner* — Zewdu A Beyen
(74) *Attorney, Agent, or Firm* — Slater & Matsil, L.L.P.

(57) ABSTRACT

A method, a system, and an apparatus for implementing a layer-2 virtual private network (L2VPN) between autonomous systems (ASs) are disclosed. The method includes: receiving a first L2VPN mapping packet from a first AS; parsing the first L2VPN mapping packet to obtain a first label carried in the first L2VPN mapping packet, applying for a second label which is different from the first label carried in the first L2VPN mapping packet, and generating a second L2VPN mapping packet according to the second label; and sending the second L2VPN mapping packet to a second AS. When multiple VPN users need to establish a multi-protocol label switching (MPLS) L2VPN between ASs, the MPLS L2VPN can be established between ASs through the technical solution under the present invention as long as a link exists between the ASs, thus providing high extensibility, high security, and convenient management of the inter-AS L2VPN.

10 Claims, 8 Drawing Sheets

OTHER PUBLICATIONS

Corresponding granted Chinese Patent No. 101277245(Application No. 200810097220.5) citing prior art at Item (56), issued May 23, 2012. 1 page only.

Rosen E C: "LDP-based signaling for L2VPNS", XP002277703, dated Sep. 2002, total 24 pages.

Martini L et al: "Pseudowire Setup and Maintenance Using the Label Distribution Protocol (LDP); rfc4447. txt", dated Apr. 1, 2006, total 34 pages.

Rosen Cisco Systems,E et al : "BGP/MPLS IP Virtual Private Networks (VPNs); rfc4364.txt", XP015044797, dated Feb. 1, 2006, total 48 pages.

Search report issued in corresponding European patent application No. EP09741679.6 , dated Oct. 22, 2010; total 10 pages.

* cited by examiner

METHOD, SYSTEM AND APPARATUS FOR IMPLEMENTING L2VPN BETWEEN AUTONOMOUS SYSTEMS

CROSS-REFERENCE TO RELATED APPLICATIONS

This application is a continuation of International Application No. PCT/CN2009/071284, filed on Apr. 15, 2009, which claims priority to Chinese Patent Application No. 200810097220.5, filed on May 6, 2008, both of which are hereby incorporated by reference in their entireties.

FIELD OF THE INVENTION

The present invention relates to communication technologies, and in particular, to a method, a system, and an apparatus for implementing a Layer 2 virtual private network (L2VPN) between autonomous systems.

BACKGROUND OF THE INVENTION

A virtual private network (VPN) is a virtual private communication network set up by an Internet service provider (ISP) or a network service provider (NSP) on a public network. A multi-protocol label switching (MPLS) L2VPN provides L2VPN services based on an MPLS network so that a service provider (SP) can deploy L2VPN services on an MPLS network.

As shown in FIG. 1, a basic model of the MPLS L2VPN includes: a provider edge routing device (PE), a customer edge routing device (CE), an attachment circuit (AC), a packet switched network (PSN) tunnel, and a pseudo wire (PW). The AC is a logical link between the CE and the PE. The PW is an encapsulated bearer channel on the PE, set up by a signaling protocol, and identified by a virtual circuit (VC) identifier and a VC type.

In actual network applications, multiple devices of one VPN user may connect to the VPN from different autonomous systems (ASs) in different cities, and the ASs may belong to a single SP or different SPs. The VPN interconnecting different ASs needs to adopt an inter-AS VPN solution.

Three solutions are currently available for implementing a MPLS VPN between ASs: Option A, Option B, and Option C, respectively. In Option A, sub-interfaces are used between different ASs. However, only a limited number of sub-interfaces can be supported by an autonomous system boundary router (ASBR), and, therefore, Option A is not well extensible. In Option B, MPLS forwarding is applied between different ASs, and the ASBR does not need to support the sub-interfaces. Therefore, Option B is more extensible than Option A. Option C is seldom used due to the reasons such as management inconvenience and lack of security.

MPLS L2VPNs can be classified into two types: point-to-point VPN and point-to-multipoint VPN. Currently, label distribution protocol (LDP) is used as a signaling protocol to transmit layer-2 information and VC labels. With the LDP, only Option A and Option C can be used to implement the VPN between ASs.

It is assumed that CE1 and CE2 belong to users of a first local VPN (VPN1), and that CE3 and CE4 belong to users of a second local VPN (VPN2). If Option A is adopted to implement the MPLS VPN between ASs, an interface (generally, a sub-interface) on the ASBR needs to be allocated to each of a user of the VPN1 and a user of the VPN2, and the intra-AS PW is extended only to these sub-interfaces. L2VPN mapping packets and VC labels are forwarded between different ASBRs according to the sub-interfaces.

Option A has the following drawbacks: a sub-interface on the ASBR needs to be allocated to each VPN user. Because some interfaces do not support sub-interfaces, and the number of sub-interfaces that can be supported by an interface is limited, it is not convenient to add users massively, and thus the network is not well extensible. Moreover, too many sub-interfaces lead to management difficulties and slow startup of devices.

It is still assumed that CE1 and CE2 belong to users of the VPN1, and that CE3 and CE4 belong to users of the VPN2. If Option C is adopted to implement the MPLS VPN between ASs, a first AS (AS1) needs to learn the route in a second AS (AS2) and set up a tunnel to the AS2; and AS2 needs to learn the route in the AS1 and set up a tunnel to the AS1 as well.

Option C has the following drawbacks:

(1) An AS needs to learn the route in other ASs and set up a tunnel to other ASs, and the user needs to take the problems of management inconvenience and lack of security into consideration.

(2) More tunnels need to be set up in an AS. In addition to the tunnels set up according to the route in this AS, more tunnels need to be set up according to the route in other ASs.

(3) Users hardly accept the Option C due to management inconvenience and lack of security.

It is found that some SPs hope to use Option B to implement the MPLS L2VPN between ASs. However, current art does not have implementation plans that support Option B in MPLS L2VPN.

SUMMARY OF THE INVENTION

The embodiments of the present invention provide a method, a system, and an apparatus for implementing L2VPN between ASs, and this method uses Option B to implement LDP-based MPLS L2VPN between ASs.

An embodiment of the present invention provides a method for implementing a L2VPN between ASs. The method includes:

receiving a first L2VPN mapping packet from a first AS;

parsing the first L2VPN mapping packet to obtain a first label carried in the first L2VPN mapping packet, applying for a second label which is different from the first label carried in the first L2VPN mapping packet, generating a second L2VPN mapping packet according to the second label; and sending the second L2VPN mapping packet to a second AS.

The embodiment of the present invention also provides a system for implementing the L2VPN between ASs. The system includes:

a first provider edge routing device (PE), configured to send a first L2VPN mapping packet;

a first ASBR, configured to receive and parse the first L2VPN mapping packet sent by the first PE, obtain a first label carried in the first L2VPN mapping packet, apply for a second label which is different from the first label carried in the first L2VPN mapping packet, generate a second L2VPN mapping packet according to the second label, and send the second L2VPN mapping packet, wherein the first PE and the first ASBR belong to a first AS;

a second ASBR, configured to receive and parse the second L2VPN mapping packet sent by the first ASBR, obtain the second label carried in the second L2VPN mapping packet, apply for a third label which is different from the second label carried in the second L2VPN mapping packet, generate a third L2VPN mapping packet according to the third label, and send the third L2VPN mapping packet, wherein the second ASBR belongs to a second AS; and a second PE, configured to receive and parse the third L2VPN mapping packet sent by the second ASBR, obtain information of the third label, a VC identifier and a type carried in the third L2VPN mapping packet, and establish an L2VPN according to the information of the third label, the VC identifier and the type carried in the third L2VPN mapping packet, wherein the second PE and the second ASBR belong to the second AS.

The embodiment of the present invention further provides an ASBR. The ASBR includes:

a receiving module, configured to receive a first L2VPN mapping packet;

a parsing module, configured to parse the first L2VPN mapping packet received by the receiving module, and obtain a first label carried in the mapping packet;

a label applying module, configured to apply for a second label which is different from the first label obtained by the parsing module;

a packet generating module, configured to generate a second L2VPN mapping packet according to the second label applied for by the label applying module; and a sending module, configured to send the second L2VPN mapping packet generated by the packet generating module.

The embodiment of the present invention also provides a PE. The PE includes:

a receiving module, configured to receive an L2VPN mapping packet sent by an ASBR;

a parsing module, configured to parse the L2VPN mapping packet received by the receiving module, and obtain information of a third label, a VC identifier and a type carried in the L2VPN mapping packet; and a L2VPN establishing module, configured to establish an L2VPN according to the information of the third label, the VC identifier and the type carried in the L2VPN mapping packet obtained by the parsing module.

Compared with the prior art, the embodiments of the present invention provide the following benefits: The ASBR receives and parses the L2VPN mapping packet from the first AS, obtains the first label carried in the mapping packet, applies for a second label which is different from the first label carried in the mapping packet, generates a second L2VPN mapping packet according to the second label, and sends the second L2VPN mapping packet to a second AS. Through the technical solutions provided by the present invention, when multiple VPN users need to establish MPLS L2VPN between ASs, if a link exists between the ASs, the MPLS L2VPN can be established between ASs, without the need of learning the routes in other ASs or establishing a tunnel according to the routes in other ASs.

DETAILED DESCRIPTION OF THE EMBODIMENTS

The embodiments of the present invention provide a method for implementing L2VPN between ASs, and this method uses Option B to implement LDP-based MPLS L2VPN between ASs. The present invention is detailed below with references to accompanying drawings and exemplary embodiments.

Figure 1:
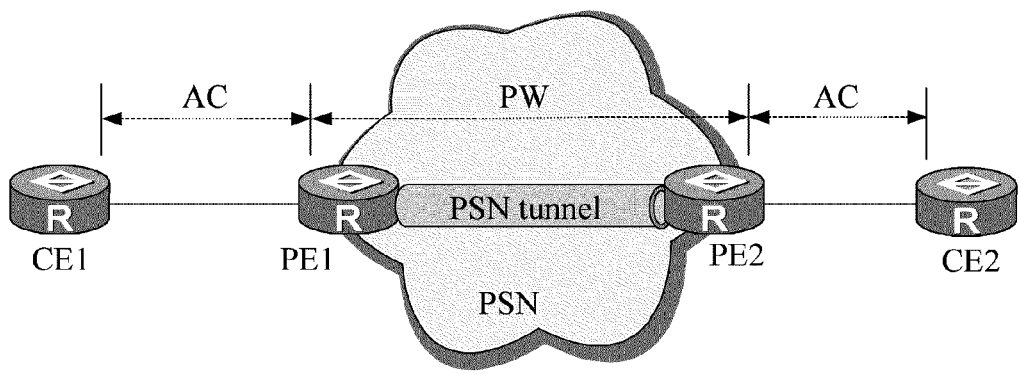
FIG. 1 shows a basic model of a MPLS L2VPN according to the prior art.
Figure 2:
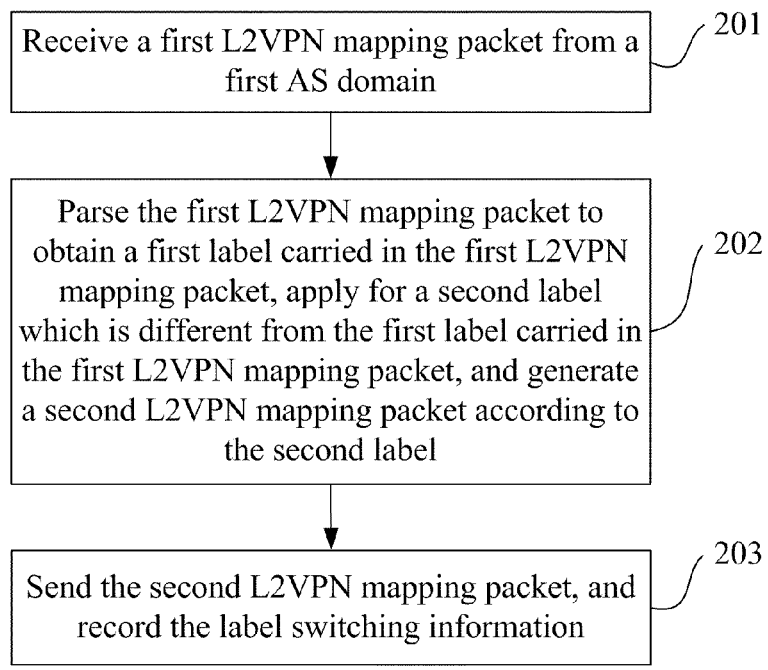
FIG. 2 is a flowchart of a method for implementing L2VPN between ASs, according to an embodiment of the invention.

FIG. 2 is a flowchart of a method for implementing L2VPN between ASs according to an embodiment of the present invention. The method includes:

201: Receiving a first L2VPN mapping packet. Before receiving the first L2VPN mapping report, a first ASBR establishes an LDP remote session with a second ASBR, and establishes a LDP remote session with a first PE in a first AS that covers the first ASBR. The first ASBR and the second ASBR belong to different SPs.

202: Parsing the first L2VPN mapping packet to obtain a first label carried in the first L2VPN mapping packet, applying for a second label which is different from the first label carried in the first L2VPN mapping packet, and generating a second L2VPN mapping packet according to the second label.

203: Sending the second L2VPN mapping packet, and recording label switching information.

After receiving the first L2VPN mapping packet sent by the first PE in the first AS that covers the first ASBR, the first ASBR sends the generated second L2VPN mapping packet to the second ASBR. The first ASBR and the second ASBR belong to different SPs. In this case, after the label switching information is recorded, the first ASBR uses the second label as an ingress label, and uses the first label carried in the first L2VPN mapping packet and a public network label switching path (LSP) as an egress label to generate MPLS forwarding entries.

Alternatively, after receiving the first L2VPN mapping packet sent by the second ASBR, the first ASBR sends the generated second L2VPN mapping packet to the first PE which is in a remote session with the first ASBR. In this case, after the label switching information is recorded, the first ASBR uses the second label as an ingress label and uses the first label carried in the first L2VPN mapping packet as an egress label to generate MPLS forwarding entries.

After the generated second L2VPN mapping packet is sent to the first PE which is in a remote session with the first ASBR, the first PE parses the second L2VPN mapping packet to obtain information of the second label a VC identifier and a type carried in the second L2VPN mapping packet; and establishes an L2VPN according to information of the second label the VC identifier and the type carried in the second L2VPN mapping packet. An example is given below.

In a point-to-point VPN scenario, after the first PE determines that an identical VC identifier and type exist in the first PE according to the information of the VC identifier and the type, the first PE obtains the IP address of the first ASBR according to the remote session between the first PE and the first ASBR, searches for the public network LSP according to the IP address of the first ASBR, and generates MPLS forwarding entries. The MPLS forwarding entries use the ingress label of a VPN user corresponding to the information of the VC identifier and the type as an index, and use the label carried in the second L2VPN mapping packet and the public network LSP as an egress label.

In a point-to-multipoint VPN scenario, after the first PE, according to information of the VC identifier and the type, determines that an identical VC identifier and an identical VC type exist in the first PE, it obtains the IP address of the first ASBR according to the established remote session between the first PE and the first ASBR, searches for the public network LSP according to the IP address of the first ASBR, and generates MPLS forwarding entries with media access control (MAC). The MPLS forwarding entries use a destination MAC address as an index and use the label carried in the second L2VPN mapping packet and the public network LSP as an egress label.

Figure 3:
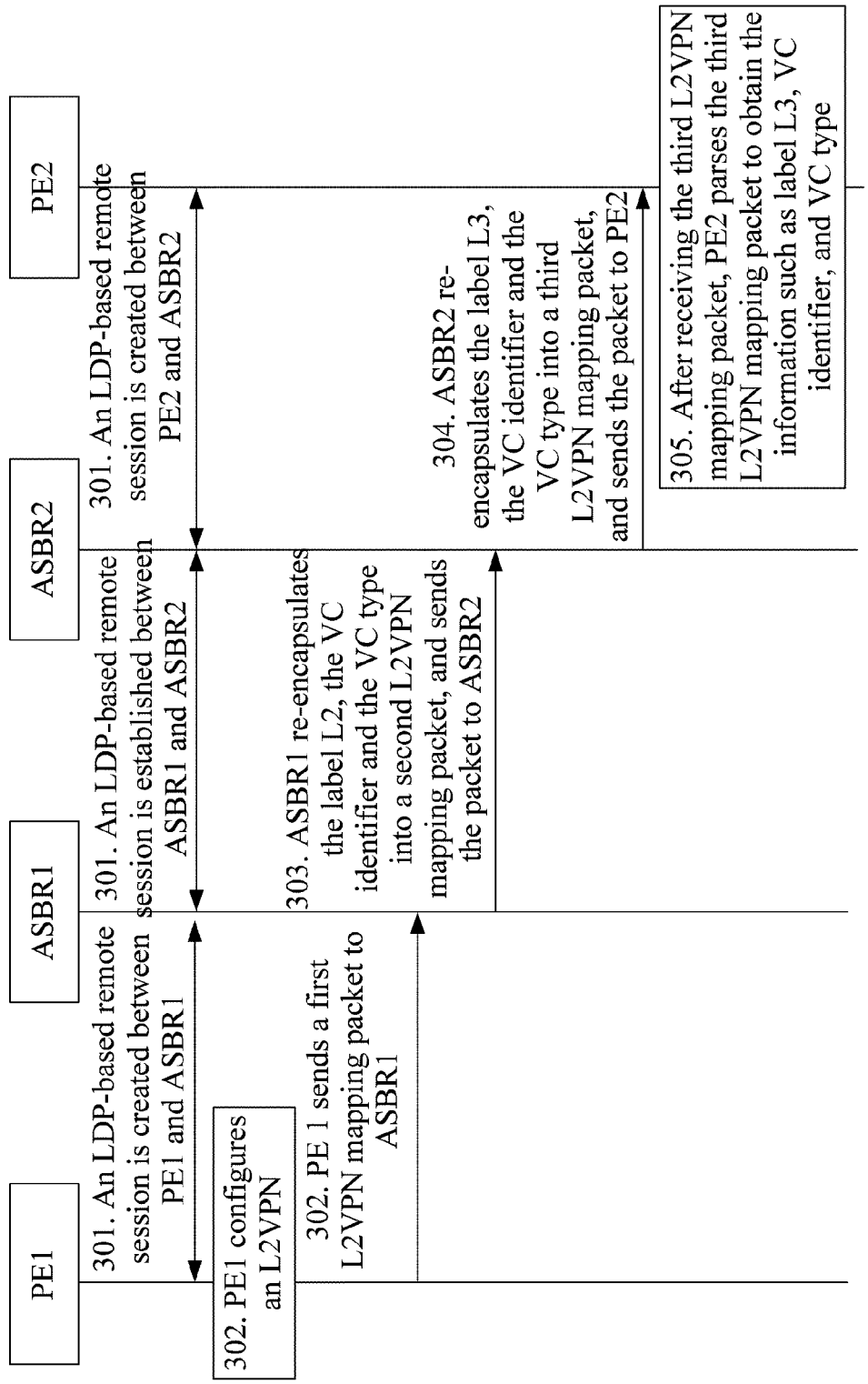
FIG. 3 is a signaling flowchart of a method for implementing L2VPN between ASs, according to an embodiment of the invention.
Figure 4:
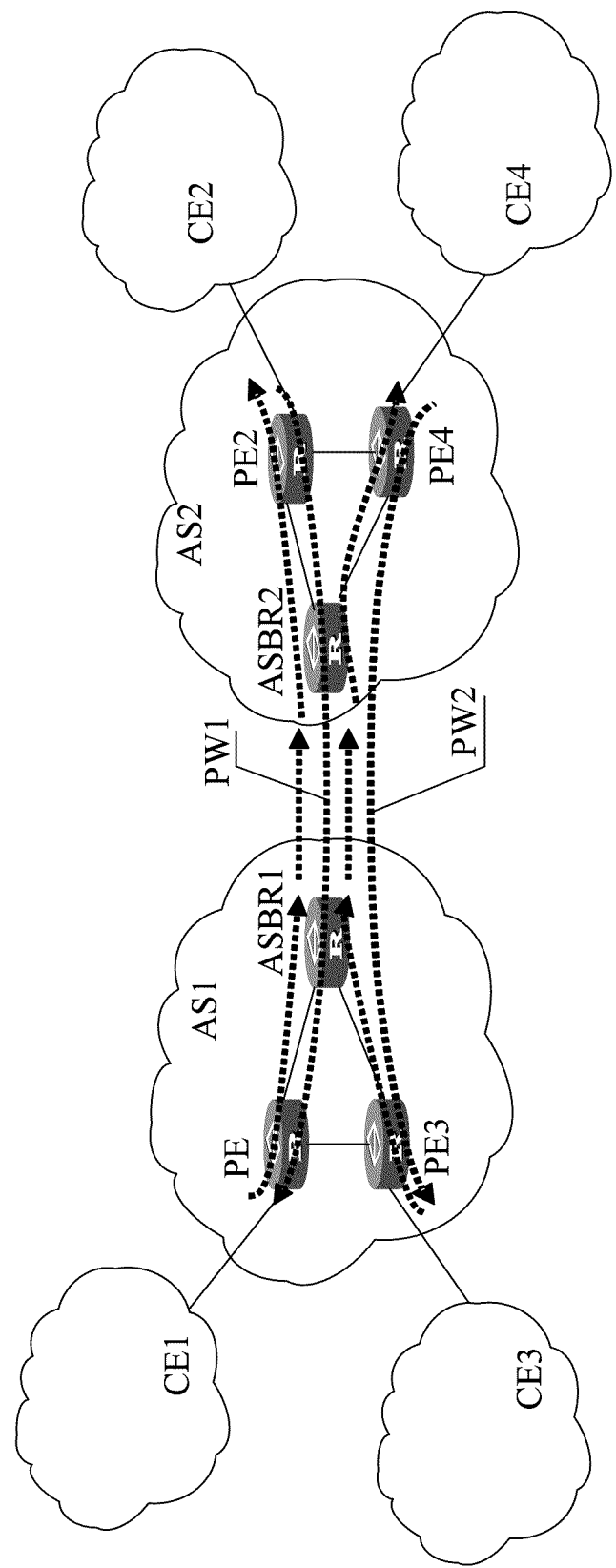
FIG. 4 shows a networking structure according to an embodiment of the invention.

FIG. 3 is a signaling flowchart of a method for implementing L2VPN between ASs in a first embodiment of the present invention. The first embodiment deals with the method for establishing MPLS L2VPN between ASs in a point-to-point VPN scenario. FIG. 4 shows a networking structure of the first embodiment of the present invention. As shown in FIG. 4, a CE1 and a CE2 need to form a VPN1, and a CE3 and a CE4 need to form a VPN2. The first embodiment showcases that a MPLS L2VPN is established between the CE1 and the CE2. The method includes:

301: A LDP remote session is established between the PE1 and the ASBR1, a LDP remote session is established between the ASBR1 and the ASBR2, and a LDP remote session is established between the ASBR2 and the PE2, respectively.

302: After configuring the L2VPN, the PE1 sends a first L2VPN mapping packet to the ASBR1. The first L2VPN mapping packet carries the information such as a VC identifier, a type, and a label L1, etc.

303: After receiving the first L2VPN mapping packet, the ASBR1 parses the packet to obtain the label L1, obtains the IP address of the PE1 according to the remote session, searches out the public network LSP, applies for a new label L2, and generates MPLS forwarding entries by using the label L2 as an ingress label and using the label L1 and the public network LSP as an egress label, and, at the same time, re-encapsulates the information such as label L2, the VC identifier and the type into a second L2VPN mapping packet which is then sent to the ASBR2.

304: After receiving the second L2VPN mapping packet, the ASBR2 parses the second L2VPN mapping packet to obtain the label L2, applies for a new label L3, and generates MPLS forwarding entries by using the label L3 as an ingress label and using the label L2 as an egress label, and, at the same time, re-encapsulates the information such as the label L3, the VC identifier and the type into a third L2VPN mapping packet which is then sent to the PE2.

Step 305: After receiving the third L2VPN mapping packet, the PE2 parses the third L2VPN mapping packet to obtain the information such as the label L3, the VC identifier and the type. Afterwards, according to the VC identifier and type, the PE2 judges whether an identical VC identifier and an identical VC type exist in the PE2. If an identical VC identifier and an identical VC type exist in the PE2, the PE2 obtains the IP address of the ASBR2 according to the remote session, searches out the public network LSP according to the IP address of the ASBR2, and generates MPLS forwarding entries by using the ingress label of local users as an index and using the label L3 and the public network LSP as an egress label. In this way, a PW is established between the PE2 and the PE1 successfully. The PE2 transmits the traffic of the CE2 to the PE1 transparently through the PW, and then the PE1 sends the traffic to the CE1.

In the reverse direction, the PW between the PE1 and the PE2 is established in the same way.

A VPN2 user may also use the foregoing method to establish two PWs between the PE3 and the PE4. The VPN1 user and the VPN2 user share a link between the ASBR1 and the ASBR2, but the label of the VPN1 user is different from the label of the VPN2 user.

Figure 5:
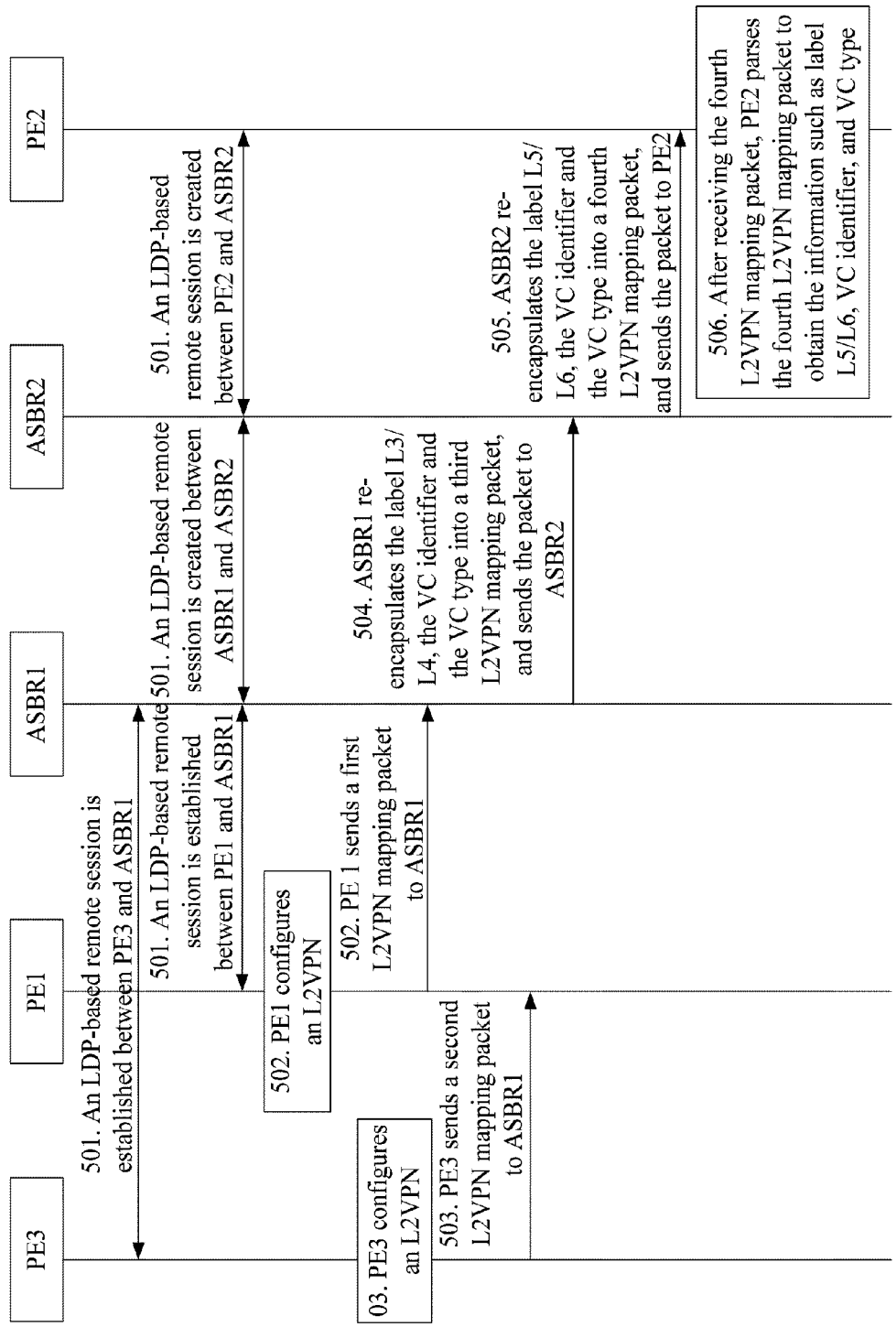
FIG. 5 is a signaling flowchart of a method for implementing L2VPN between ASs, according to another embodiment of the invention.
Figure 6:
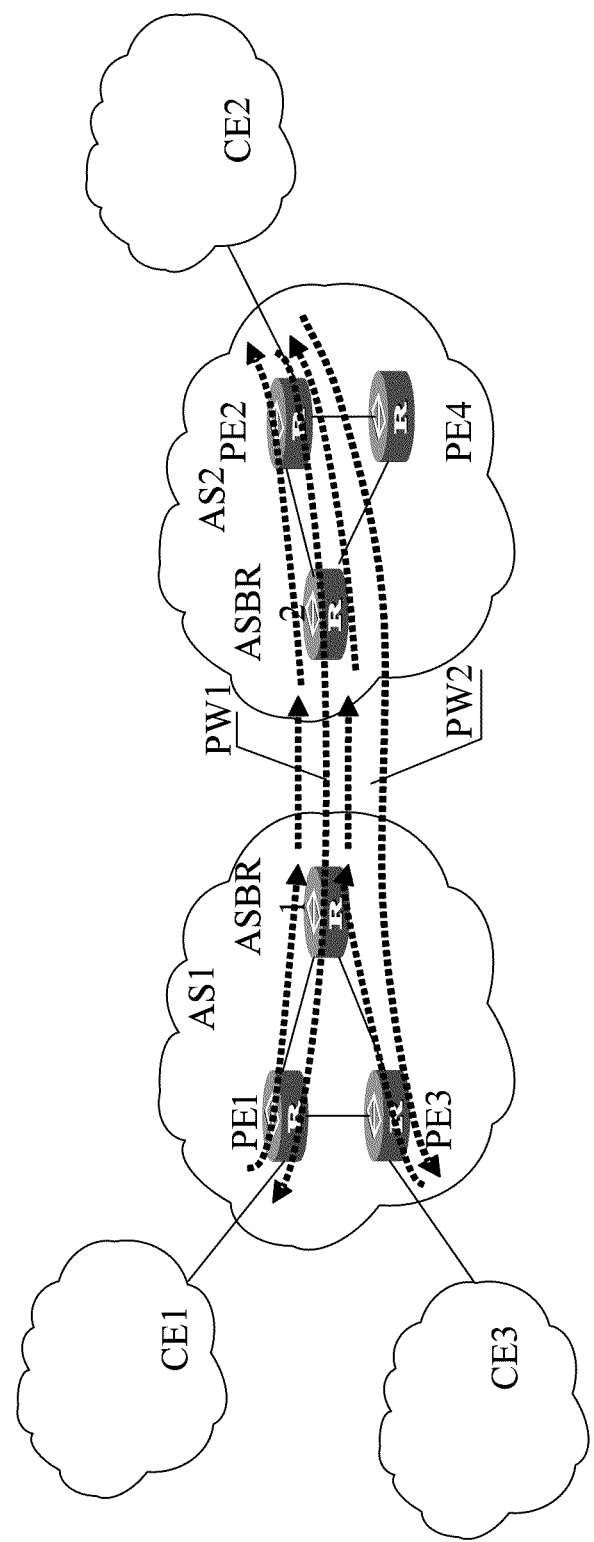
FIG. 6 shows a networking structure according to another embodiment of the invention.

FIG. 5 is a signaling flowchart of a method for implementing L2VPN between ASs in a second embodiment of the present invention. The second embodiment deals with the method for establishing a MPLS L2VPN between ASs in a point-to-multipoint VPN scenario. FIG. 6 shows a networking structure of the second embodiment of the invention. As shown in FIG. 6, CE1, CE2 and CE3 belong to the same VPN; CE1 and CE3 access AS1; CE2 accesses AS2; and an MPLS L2VPN is established between the AS1 and the AS2. The establishing process includes:

501: LDP remote sessions are established between the ASBR1 and the PE1, PE3, respectively, an LDP remote session is established between the ASBR1 and the ASBR2, and an LDP remote session is established between the ASBR2 and the PE2.

502: After configuring the L2VPN, the PE1 sends a first L2VPN mapping packet to the ASBR1. The first L2VPN mapping packet carries the information such as a VC identifier, a type, a label L1, and so on.

503: After configuring the L2VPN, the PE3 sends a second L2VPN mapping packet to the ASBR1. The second L2VPN mapping packet carries the information such as a VC identifier, a type, a label L2, and so on. Because the PE1 and the PE3 belong to the same VPN, the VC identifier and the VC type of PE3 are identical to the VC identifier and the VC type of the PE1, but the label of the PE3 may be different from the label of the PE1.

504: After receiving the first L2VPN mapping packet and the second L2VPN mapping packet, the ASBR1 parses the packets to obtain the labels L1 and L2, obtains the IP addresses of the PE1 and the PE3 according to the remote session, searches out the public network LSP, applies for a new label L3 (corresponding to the VPN from the PE1) and a new label L4 (corresponding to the VPN from the PE3), and generates MPLS forwarding entries to the PE1 and the PE3, respectively, by using the label L3/L4 as an ingress label and, using the label L1/L2 and the public network LSP as an egress label, and, at the same time, re-encapsulates the information such as the label L3/L4, the VC identifier, the type and so on into a third L2VPN mapping packet which is then sent to the ASBR2.

505: After receiving the third L2VPN mapping packet, the ASBR2 parses the third L2VPN mapping packet to obtain the label L3/L4, applies for a new label L5/L6, and generates MPLS forwarding entries by using the L5/L6 as an ingress label and using the L3/L4 as an egress label, and at the same time, re-encapsulates the information such as the label L5/L6, the VC identifier, the type and so on into a fourth L2VPN mapping packet which is then sent to the PE2. If a remote session is already established between the ASBR2 and other PEs in the AS, it is necessary to send the fourth L2VPN mapping packet to such PEs.

506: After receiving the fourth L2VPN mapping packet, the PE2 parses the fourth L2VPN mapping packet to obtain the information such as the label L5/L6, the VC identifier the type and so on. Afterward, according to the VC identifier and the VC type, the PE2 judges whether an identical VC identifier and an identical VC type exist in the PE2. If an identical VC identifier and an identical VC type exist in the PE2, the PE2 obtains the IP address of the ASBR2 according to the remote session, searches out the public network LSP according to the IP address of the ASBR2, and generates MPLS forwarding entries through MAC learning. The MPLS forwarding entries use the destination MAC address as an index and use the label L5/L6 and the public network LSP as an egress label.

In this way, a PW is established between the PE2 and the PE1/PE3 successfully. The PE2 transmits the traffic of the CE2 to the PE1 or the PE3 transparently through the PW which is selected according to whether the destination MAC address is CE1 or CE3. More specifically, the traffic from the CE2 to the PE1 is transmitted through the PW corresponding to the L5, and the traffic from the CE2 to the CE3 is transmitted through the PW corresponding to the L6. Afterward, the PE1 sends the traffic to the CE1, or the PE3 sends the traffic to the CE3.

In the reverse direction, the PW between the PE1/PE3 and the PE2 is established in the same way.

In the foregoing method for implementing L2VPN between ASs, when multiple VPN users need to establish MPLS L2VPN between ASs, as long as a link exists between the ASs, the MPLS L2VPN can be established between the ASs, without the need of learning the route in other ASs or setting up a tunnel according to the route in other ASs. The extensibility bottleneck involved in the existing Option A that requires multiple links or multiple sub-interfaces is overcome. Moreover, the management is more convenient, and the security is higher, thus avoiding the security and management problems in Option C.

Figure 7:
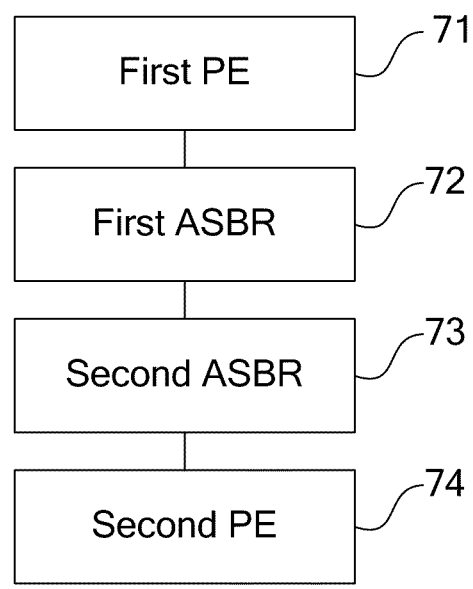
FIG. 7 shows a structure of a system for implementing L2VPN between ASs, according to an embodiment of the invention.

FIG. 7 shows a structure of a system for implementing L2VPN between ASs according to an embodiment of the present invention. The system includes:

a first PE 71, configured to send a first L2VPN mapping packet;

a first ASBR 72, configured to: receive and parse the first L2VPN mapping packet sent by the first PE 71, obtain a first label carried in the first L2VPN mapping packet, apply for a second label which is different from the first label carried in the first L2VPN mapping packet, generate a second L2VPN mapping packet according to the second label, send the second L2VPN mapping packet, and record label switching information, wherein the first PE 71 and the first ASBR 72 belong to the same AS;

a second ASBR 73, configured to: receive and parse the second L2VPN mapping packet sent by the first ASBR 72, obtain the second label carried in the second L2VPN mapping packet, apply for a third label which is different from the second label carried in the second L2VPN mapping packet, generate a third L2VPN mapping packet according to the third label, send the third L2VPN mapping packet, and record the label switching information; and a second PE 74, configured to: receive and parse the third L2VPN mapping packet sent by the second ASBR 73, obtain the information of the third label, a VC identifier and a type carried in the third L2VPN mapping packet, and establish an L2VPN according to the information of the third label, the VC identifier and the type carried in the third L2VPN mapping packet.

When using the foregoing system for implementing L2VPN between ASs, the first PE 71 sends the first L2VPN mapping packet to the first ASBR 72, the first ASBR 72 belonging to the same AS which the first PE 71 is located in. After receiving the first L2VPN mapping packet sent by the first PE 71, the first ASBR 72 parses the first L2VPN mapping packet to obtain the first label carried in the first L2VPN mapping packet, applies for a second label which is different from the first label carried in the first L2VPN mapping packet, generates a second L2VPN mapping packet according to the second label, sends the second L2VPN mapping packet to the second ASBR 73, and records label switching information. The details of recording the label switching information may be: using the second label as an ingress label and using the first label carried in the first L2VPN mapping packet and the public network LSP as an egress label to generate MPLS forwarding entries.

After receiving the second L2VPN mapping packet sent by the first ASBR 72, the second ASBR 73 parses the second L2VPN mapping packet to obtain the second label carried in the second L2VPN mapping packet, applies for a third label which is different from the second label carried in the second L2VPN mapping packet, generates a third L2VPN mapping packet according to the third label, sends the third L2VPN mapping packet to the second PE 74 which is in a remote session with the second ASBR 73, and records the label switching information. In this case, the details of recording the label switching information may be: using the third label as an ingress label and using the second label carried in the second L2VPN mapping packet as an egress label to generate MPLS forwarding entries.

After receiving the third L2VPN mapping packet sent by the second ASBR 73, the second PE 74 parses the third L2VPN mapping packet to obtain the information of the third label, the VC identifier and the type carried in the third L2VPN mapping packet, and establishes an L2VPN according to the information of the third label, the VC identifier and the type carried in the third L2VPN mapping packet.

Figure 8:
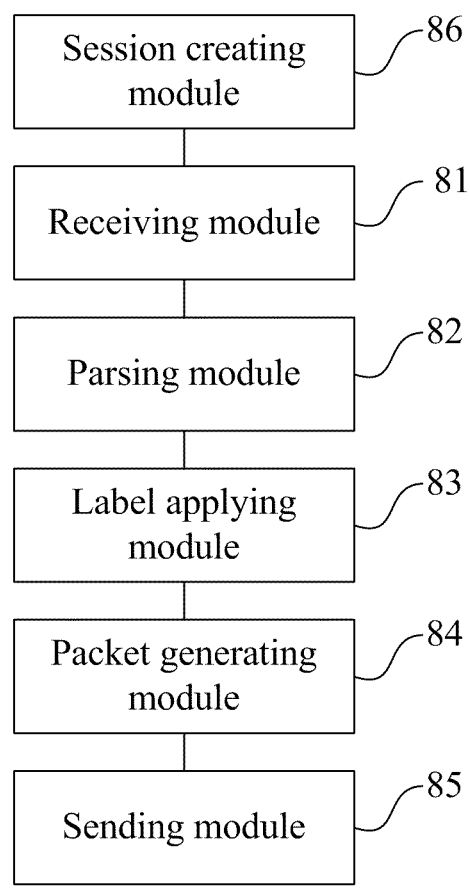
FIG. 8 shows a structure of an ASBR according to an embodiment of the invention.

FIG. 8 shows a structure of an ASBR in an embodiment of the present invention. The ASBR includes:

a receiving module 81, configured to receive a first L2VPN mapping packet;

a parsing module 82, configured to parse the first L2VPN mapping packet received by the receiving module 81, and obtain a first label carried in the first L2VPN mapping packet;

a label applying module 83, configured to apply for a second label which is different from the first label obtained by the parsing module 82;

a packet generating module 84, configured to generate a second L2VPN mapping packet according to the second label applied for by the label applying module 83; and a sending module 85, configured to send the second L2VPN mapping packet generated by the packet generating module 84, and record label switching information.

After the receiving module 81 receives the first L2VPN mapping packet sent by the PE in the AS that covers the ASBR, the sending module 85 sends the generated second L2VPN mapping packet to a second ASBR. In this case, after the label switching information is recorded, the ASBR uses the second label applied for by the label applying module 83 as an ingress label and uses the first label carried in the first L2VPN mapping packet received by the receiving module 81 and the public network LSP as an egress label to generate MPLS forwarding entries.

Alternatively, after the receiving module 81 receives the first L2VPN mapping packet sent by the second ASBR, the sending module 85 sends the generated second L2VPN mapping packet to the PE which is in a remote session with the ASBR. In this case, after the label switching information is recorded, the ASBR uses the second label applied for by the label applying module 83 as an ingress label and uses the first label carried in the first L2VPN mapping packet received by the receiving module 81 as an egress label to generate MPLS forwarding entries.

The ASBR may further include a session establishing module 86, configured to establish an LDP remote session with a second ASBR and establish an LDP remote session with a PE in the AS that covers the ASBR. In this way, the ASBR can receive the first L2VPN mapping packet sent by the PE in the AS that covers the ASBR, and can receive the first L2VPN mapping packet sent by the second ASBR.

Figure 9:
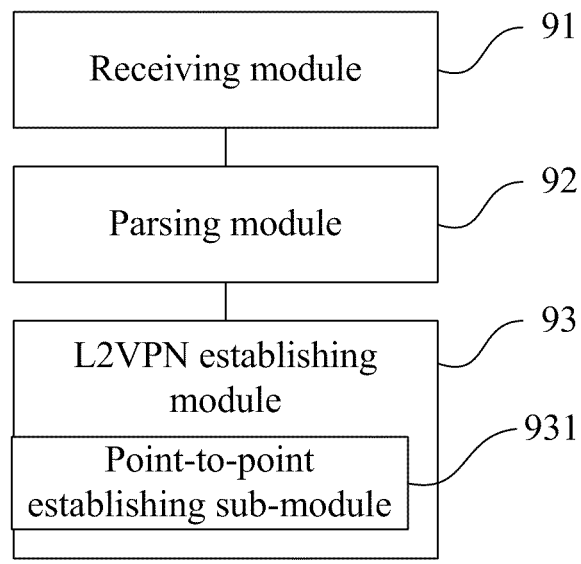
FIG. 9 shows a structure of a PE according to an embodiment of the invention.

FIG. 9 shows a structure of a PE in an embodiment of the present invention. The PE includes:

a receiving module 91, configured to receive an L2VPN mapping packet sent by an ASBR;

a parsing module 92, configured to parse the L2VPN mapping packet received by the receiving module 91, and obtain a label, a VC identifier, and a VC type carried in the L2VPN mapping packet; and an L2VPN establishing module 93, configured to establish an L2VPN according to the label, the VC identifier and the VC type carried in the L2VPN mapping packet obtained by the parsing module 92.

The L2VPN establishing module 93 may further include a point-to-point establishing sub-module 931, configured to: in a point-to-point VPN scenario, after the PE determines that an identical VC identifier and VC type exist in the PE according to the VC identifier and VC type, obtain the IP address of the ASBR according to the remote session between the PE and the ASBR, search for the public network LSP according to the IP address of the ASBR, and generate MPLS forwarding entries, wherein the MPLS forwarding entries use the ingress label of the VPN user corresponding to the VC identifier and VC type as an index and use the label carried in the L2VPN mapping packet and the public network LSP as an egress label.

Figure 10:
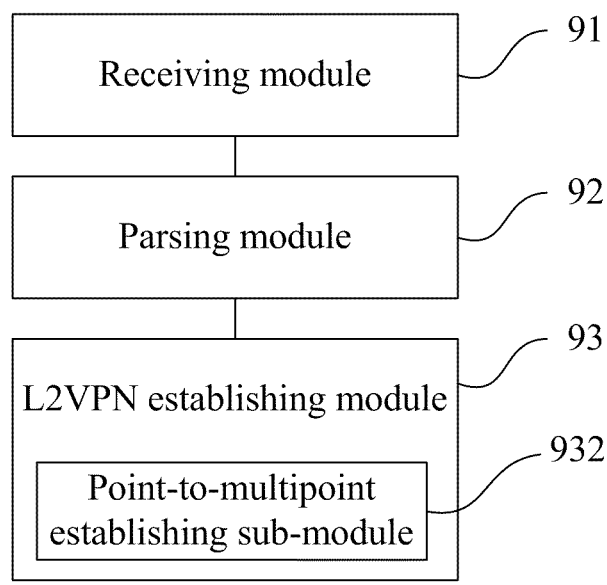
FIG. 10 shows a structure of a PE according to another embodiment of the invention.

As shown in FIG. 10, in another embodiment of the present invention, the L2VPN establishing module 93 may further include: a point-to-multipoint establishing sub-module 932, configured to: in a point-to-multipoint VPN scenario, after the PE determines that an identical VC identifier and an identical VC type exist in the PE according to the VC identifier and the VC type, obtain the IP address of the ASBR according to the remote session between the PE and the ASBR, search for the public network LSP according to the IP address of the ASBR, and generate MPLS forwarding entries with a MAC address, wherein the MPLS forwarding entries use the destination MAC address as an index and use the label carried in the L2VPN mapping packet and the public network LSP as an egress label.

After reading the descriptions of the foregoing embodiments, those skilled in the art are clearly aware that the present invention may be implemented through hardware, or through software in addition to a necessary universal hardware platform. Therefore, the technical solutions under the present invention may be embodied as a software product. The software product may be stored in a non-volatile storage medium (such as a CD-ROM, a USB disk, or a mobile hard disk), and may include several instructions that enable a computer device (such as a personal computer, a server, or a network device) to perform the methods provided in the embodiments of the present invention.

The above descriptions are merely exemplary embodiments of the present invention and not intended to limit the scope of the present invention. Any modifications, equivalent replacements, or improvements made without departing from the spirit and principle of the present invention should fall within the scope of the present invention.

What is claimed is:

1. A method for implementing a layer-2 virtual private network (L2VPN) between autonomous systems, the method comprising:

receiving, by a first Autonomous System Boundary Router (ASBR) of a first autonomous system (AS), a first L2VPN mapping packet;

parsing, by the first ASBR, the first L2VPN mapping packet to obtain a first label carried in the first L2VPN mapping packet, applying, by the first ASBR, for a second label which is different from the first label carried in the first L2VPN mapping packet, generating, by the first ASBR, a second L2VPN mapping packet according to the second label;

sending, by the first ASBR, the second L2VPN mapping packet to a second ASBR of a second AS; and recording, by the first ASBR, label switching information;

wherein the first ASBR and the second ASBR belong to different service providers;

wherein receiving the first L2VPN mapping packet comprises receiving the first L2VPN mapping packet sent by the second ASBR; and wherein, sending the second L2VPN mapping packet to the second ASBR comprises:

sending the generated second L2VPN mapping packet to a second provider edge routing device (PE), which is in a remote session with the second ASBR;

parsing, by the second PE, the second L2VPN mapping packet to obtain information of the second label, virtual circuit (VC) identifier and a type carried in the second L2VPN mapping packet; and building a L2VPN according to the information of the second label, the VC identifier and the type carried in the second L2VPN mapping packet;

wherein for a point-to-point virtual private network (VPN) scenario, building the L2VPN according to the information of the second label, the VC identifier and the type carried in the second L2VPN mapping packet, comprises:

determining, by the second PE, an identical VC identifier and VC type exist in the PE according to the VC identifier and the type;

obtaining, by the second PE, the IP address of the second ASBR according to the remote session between the second PE and the second ASBR, searching, by the second PE, for the public network LSP according to the IP address of the second ASBR; and generating MPLS forwarding entries, wherein the MPLS forwarding entries use the ingress label of a VPN user corresponding to the VC identifier and VC type as an index and use the label carried in the second L2VPN mapping packet and the public network LSP as an egress label.

2. The method of claim 1, wherein before receiving the first L2VPN mapping packet, the method further comprises:

establishing, by the first ASBR, a label distribution protocol (LDP) remote session with the second ASBR, and establishing, by the second ASBR, an LDP remote session with the second provider edge routing device (PE), in the second AS which the second ASBR is located in.

3. The method of claim 1, wherein
receiving the first L2VPN mapping packet comprises:
receiving the first L2VPN mapping packet sent by a first provider edge routing device (PE) in the first AS.

4. The method of claim 1, wherein after recording the label switching information, the method further comprising:
generating, by the first ASBR, multi-protocol label switching (MPLS) forwarding entries by taking the second label as an ingress label and taking the first label and a public network label switching path (LSP) as an egress label.

5. The method of claim 1, after recording label switching information, the method further comprising:
taking the second label as an ingress label and taking the first label carried in the first L2VPN mapping packet as an egress label to generate multi-protocol label switching (MPLS) forwarding entries.

6. The method of claim 1, wherein for a point-to-multipoint virtual private network (VPN) scenario, building the L2VPN according to the information of the second label, the VC identifier and the type carried in the second L2VPN mapping packet, comprises:
determining, by the second PE, an identical VC identifier and VC type exist in the PE according to the VC identifier and the type;
obtaining, by the second PE, the IP address of the ASBR according to the remote session between the second PE and the second ASBR;
searching, by the second PE, for the public network LSP according to the IP address of the second ASBR; and
generating MPLS forwarding entries with the Media Access Control (MAC) address, wherein the MPLS forwarding entries use the destination MAC address as an index and use the label carried in the second L2VPN mapping packet and the public network LSP as an egress label.

7. A system for implementing a layer-2 virtual private network (L2VPN) between autonomous systems, the system comprising:
a first provider edge routing device (PE), configured to send a first L2VPN mapping packet;
a first autonomous system boundary router (ASBR), configured to receive and parse the first L2VPN mapping packet sent by the first PE, obtain a first label carried in the first L2VPN mapping packet, apply for a second label which is different from the first label carried in the first L2VPN mapping packet, generate a second L2VPN mapping packet according to the second label, send the second L2VPN mapping packet, and record label switching information, wherein the first PE and the first ASBR belong to a first autonomous system (AS);
a second ASBR, configured to receive and parse the second L2VPN mapping packet sent by the first ASBR, obtain the second label carried in the second L2VPN mapping packet, apply for a third label which is different from the second label carried in the second L2VPN mapping packet, generate a third L2VPN mapping packet according to the third label, send the third L2VPN mapping packet, and record label switching information, wherein the first ASBR and the second ASBR belong to different service providers; and
a second PE, configured to receive and parse the third L2VPN mapping packet sent by the second ASBR, obtain information of the third label, a virtual circuit (VC) identifier and a type carried in the third L2VPN mapping packet, and build an L2VPN according to the information of the third label, the VC identifier and the type carried in the third L2VPN mapping packet, wherein the second PE and the second ASBR belong to a second AS; wherein building the L2VPN according to the information of the third label, the VC identifier and the type carried in the third L2VPN mapping packet, comprises:
in a point-to-point VPN scenario, after the second PE determines that an identical VC identifier and VC type exist in the second PE according to the VC identifier and the type, the second PE obtains the IP address of the second ASBR according to the remote session between the second PE and the second ASBR, searches for the public network LSP according to the IP address of the second ASBR, and generates MPLS forwarding entries, wherein the MPLS forwarding entries use the ingress label of a VPN user corresponding to the VC identifier and VC type as an index and use the label carried in the third L2VPN mapping packet and the public network LSP as an egress label.

8. The system of claim 7, wherein building the L2VPN according to the information of the third label, the VC identifier and the type carried in the third L2VPN mapping packet, comprises:
in a point-to-multipoint VPN scenario, after the second PE determines that the identical VC identifier and VC type exist in the second PE according to the VC identifier and the type, the second PE obtains the IP address of the second ASBR according to the remote session between the second PE and the second ASBR, searches for the public network LSP according to the IP address of the second ASBR, and generates MPLS forwarding entries with the Media Access Control (MAC) address, wherein the MPLS forwarding entries use the destination MAC address as an index and use the label carried in the third L2VPN mapping packet and the public network LSP as an egress label.

9. A provider edge routing device (PE), comprising:
a receiving module, configured to receive a layer-2 virtual private network (L2VPN) mapping packet sent by an autonomous system boundary router (ASBR);
a parsing module, configured to parse the L2VPN mapping packet received by the receiving module, and obtain a label, a virtual circuit (VC) identifier and a VC type carried in the L2VPN mapping packet; and
an L2VPN establishing module, configured to establish an L2VPN according to the label, the VC identifier and the VC type carried in the L2VPN mapping packet obtained by the parsing module; wherein for a point-to-point virtual private network (VPN) scenario, the L2VPN establishing module comprises:
a point-to-point establishing sub-module, configured to, after the PE determines that an identical VC identifier and an identical VC type exist in the PE, obtain an Internet protocol (IP) address of the ASBR according to a remote session between the PE and the ASBR, search for a public network label switching path (LSP) according to the IP address of the ASBR, and create multi-protocol label switching (MPLS) forwarding entries, wherein the MPLS forwarding entries take an ingress label of a VPN user corresponding to the VC identifier and the VC type as an index and take the label carried in the L2VPN mapping packet and the public network LSP as an egress label.

10. The PE of claim 9, wherein for a point-to-multipoint virtual private network (VPN) scenario, the L2VPN establishing module comprises:

a point-to-multipoint establishing sub-module, configured to, after the PE determines that an identical VC identifier and an identical VC type exist in the PE, obtain an Internet protocol (IP) address of the ASBR according to a remote session between the PE and the ASBR, search for a public network label switching path (LSP) according to the IP address of the ASBR, and create multi-protocol label switching (MPLS) forwarding entries with a media access control (MAC) address, wherein the MPLS forwarding entries take a destination MAC address as an index and take the label carried in the L2VPN mapping packet and the public network LSP as an egress label.

* * * * *